Aug. 22, 1961 B. E. KING 2,997,593
PHOTO-ELECTRIC SCANNER FOR LINE-FOLLOWING DEVICES
Filed Sept. 26, 1960
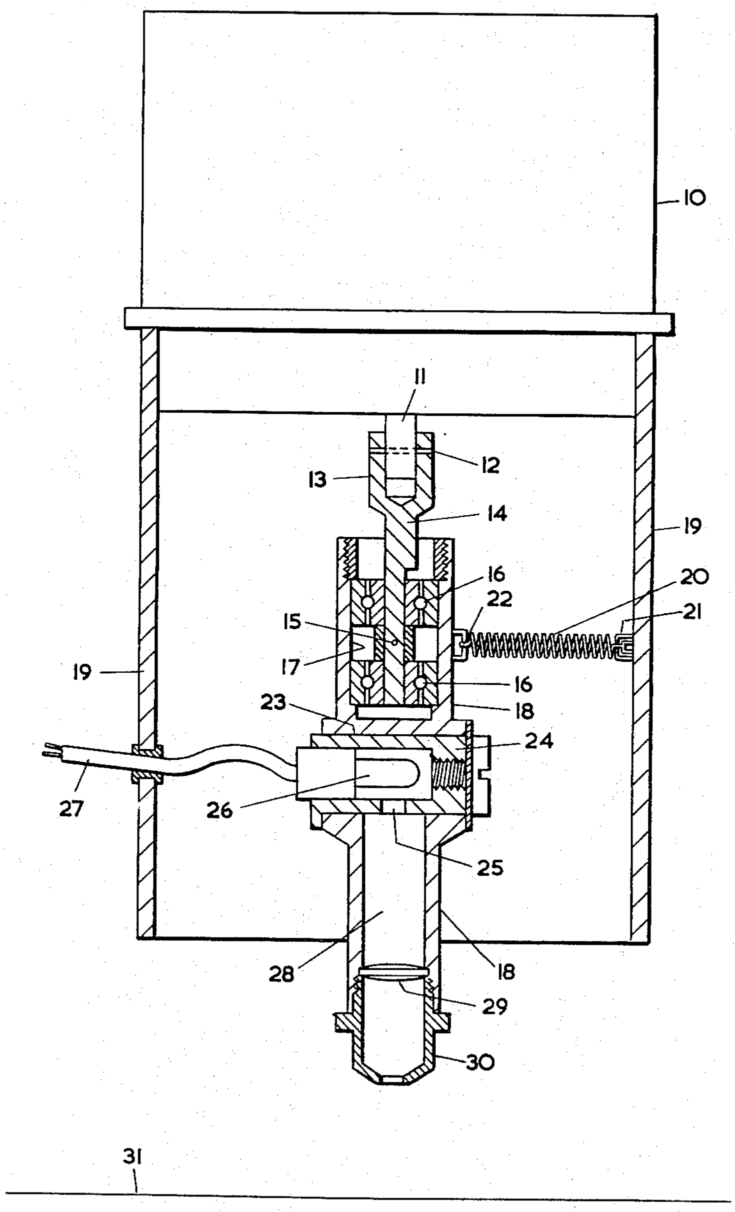
INVENTORS
Brian Edmund King
BY
ATTORNEY United States Patent Office 2,997,593

Patented Aug. 22, 1961

2,997,593

PHOTO-ELECTRIC SCANNER FOR LINE-FOLLOWING DEVICES

Brian Edmund King, Cuffley, England, assignor to The British Oxygen Company Limited, a British company Filed Sept. 26, 1960, Ser. No. 58,362
Claims priority, application Great Britain Sept. 30, 1959
2 Claims. (Cl. 250—202)

This invention relates to a photo-electric scanner for line-following devices such as are used for controlling machine operations, for example the movement of the cutting nozzle of a flame-cutting machine which is cutting plate to a shape corresponding with a line drawing, the latter being traversed by a photo-electric line-following device which scans the line drawing during operation.

Various methods of effecting the scanning function have already been proposed. For example, it is known to project a spot of light onto an outline, so that the spot is half on a dark background and half on a light background, and to detect variations of that condition of the spot by a photo-electric cell, whereby the spot is caused to follow the outline.

A moving light spot is also known, which is caused to cross and re-cross a line, and it is also known to illuminate a line drawing, and to vibrate a photo-electric cell to and fro above the line.

The present invention is concerned with an improved mechanism for moving a photo-electric cell of a line following device to and fro for scanning a line.

According to the present invention, a mechanism for effecting scanning movement of the photo-electric cell of a line-following device comprises a motor driving a shaft which is drivably connected to a carrier member supporting the photo-electric cell by means of an eccentric mechanism, the carrier member being resiliently restrained against rotation so that a scanning motion of the photoelectric cell supported by said carrier member is derived from the rotation of the shaft.

An embodiment of the invention will now be described with reference to the accompanying drawing, which is a diagrammatic sectional side elevation of a mechanism constructed according to the invention.

Referring to the drawing, an electric motor 10 rotatably drives a shaft 11, the latter being secured by a cross-pin 12 in a socket 13 formed at one end of a second shaft 14. Integral with the second shaft 14 is an eccentric spindle 15, which is rotatably mounted by means of anti-friction bearings 16 within a bore 17 at the upper part of a carrier member 18.

An open-bottomed casing 19 secured to the motor 10 laterally encloses the major portion of the carrier member 18, and a spring 20, anchored by one end to the casing 20 at 21 and by its other end to the carrier member 18 at 22, resiliently restrains the carrier member 18 against rotation.

The shaft 14, eccentric spindle 15, and the anti-friction bearings 16 within the bore 17, constitute an eccentric driving mechanism whereby the carrier member 18, while being restrained against rotation by the spring 20, performs an orbiting motion derived from the rotation of said shaft 14 and the consequential eccentric movement of the spindle 15.

The carrier member has a cross-bore 23 which receives a removable sleeve 24, the latter having a window at 25 and serving as a mounting for a photo-transistor 26 which views downwardly through said window 25. The screened flexible leads 27 of the photo-transistor 26 pass outwardly through the protective casing 19, and have sufficient excess length and flexibility to accommodate the orbiting motion of the photo-transistor 26 as it moves with the carrier member 18. The screened flexible leads 27 may be sufficiently robust to be themselves capable of resiliently restraining the carrier member 18 against rotation, and if so the spring 20 could be dispensed with.

The window 25 in the sleeve 24 opens downwardly into a bore 28 in the bottom portion of the carrier member 18, and as is customary in photo-electric line-following devices, an optical lens 29 is secured in said bore 28 by means of a removable apertured cap 30. A line undergoing scanning is indicated at 31.

The eccentric mechanism which drivably connects the motor-driven shaft with the carrier member may differ from the example described and illustrated in the drawing.

For example, the motor shaft may rotate a member having an eccentric socket therein, which socket slidably receives a spindle projecting concentrically from the carrier member, so that the carrier member resiliently restrained against rotation performs an orbiting movement as the motor shaft rotates.

The invention provides a scanning mechanism which is of simple and cheap construction, and which is found to be trouble-free and reliable in operation, and it will be appreciated that the use of such complicated arrangements as slip rings for conducting electric current to the photo-electric cell is eliminated since while the cell performs an orbiting motion it does not rotate about an axis, and thus current can be supplied to the cell by simple flexible conductors.

I claim:

1. In a mechanism for effecting scanning movement of the photo-electric cell of a line-following device, the combination of a shaft, a motor driving said shaft in rotation, a carrier member, a photo-electric cell, means mounting said photo-electric cell on said carrier member, an eccentric mechanism drivably connecting said shaft with said carrier member, and resilient means restraining said carrier against rotation, so that a scanning motion of the carrier member supporting the photo-electric cell is derived from the rotation of said shaft.

2. In a mechanism for effecting scanning movement of the photo-electric cell of a line-following device, the combination of a motor, a shaft driven in rotation by said bore, a photo-electric cell, means mounting said shaft, a carrier member having a bore therein, bearing means rotatably mounting said eccentric spindle within said bore, a photo-electric cell, means mounting said photo-electric cell on said carrier member, and resilient means restraining said carrier member against rotation while permitting it to perform an orbiting motion derived from the rotation of said shaft and the consequential eccentric movement of said spindle.

References Cited in the file of this patent

UNITED STATES PATENTS

| | | |
|---|---|---|
| 2,393,186 | Potter | Jan. 15, 1946 |
| 2,609,513 | Boucher et al. | Sept. 2, 1952 |
| 2,899,564 | Rabinow et al. | Aug. 11, 1959 |